3,706,693
HYDROCARBON CONVERSION CATALYSTS
Grant A. Mickelson and Darryl L. Jones, Yorba Linda, and William J. Baral, Long Beach, Calif., assignors to Union Oil Company of California, Los Angeles, Calif.
Filed July 10, 1970, Ser. No. 53,814
Int. Cl. B01j 11/82, 11/40
U.S. Cl. 252—435
18 Claims

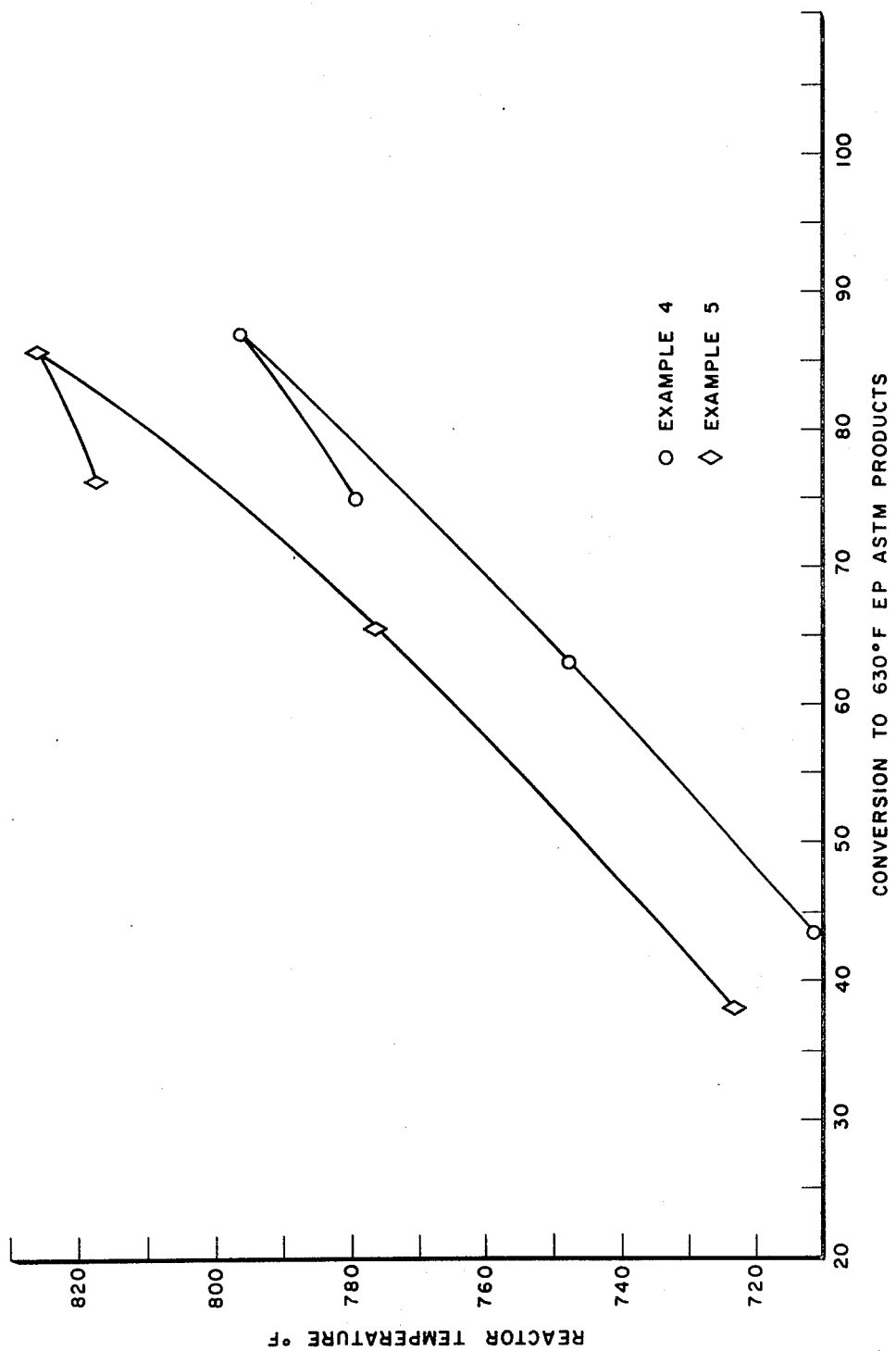

ABSTRACT OF THE DISCLOSURE

Hydrocarbon nconversion catalysts having markedly improved characteristics are prepared from intimate admixtures of foraminous alumina-containing refractory oxides and ion exchangeable aluminum-containing composites, such as crystalline alumiosilicate zeolites, silica-alumina cogels, and the like, upon impregnation with a strong acidic solution containing Group VIII and Group VI metal compounds and an acid of phosphorus at a pH below 3.

BACKGROUND

Hydrocarbon conversion catalysts containing Group VIII metals or metal compounds, e.g., oxides, sulfides, etc., particularly compounds of cobalt or nickel, Group VI metals or compounds, particularly molybdenum or tungsten, and phosphorus on alumina or silica-stabilized alumina have been studied with regard to their hydrotreating activity, i.e., denitrogenation and desulfurization activity, by previous investigators. Exemplary of studies that have been conducted in this regard are U.S. Pats. 3,232,887 and 3,287,280. In view of the improved properies exhibited by these compositions they have found commercial application for the denitrogenation and desulfurization of petroleum feedstocks. The latter of these two publications, U.S. Pat. 3,287,280, discusses methods and impregnating solutions for preparing certain catalysts having compositions falling within the general class consisting of molybdenum and nickel salts stabilized with phosphoric acid in an aqueous medium. The discussion and examples provided in that publication demonstrate the desirability of maintaining the absolute and relative concentrations of the several impregnating constituents within relatively narrow ranges.

Further investigation of this class of catalysts, discussed by Grant A. Mickelson in copending application Ser. No. 837,340 filed June 27, 1969, now abandoned led to the observation that for the accomplishment of certain objectives the ratio of phosphorus to Group VI metal employed in such solutions was particularly critical and that the activity of the resulting catalyst is substantially enhanced by the use of higher phosphorus to Group VI metal ratios than was previously considered necessary or advantageous. Mickelson also observed that particular care in the regulation of pH of the impregnating solution when contacted with the selected foraminous refractory oxide support was also essential to the realization of maximum catalytic activity.

The superior activity of these catalysts in hydrofining and hydrocracking, particularly midbarrel hydrocracking, as compared to the previously favored zeolite-base catalysts, was unexpected in view of the previously held belief that few if any catalysts could compete with the aluminosilicate catalysts due to certain inherent characteristics of the zeolite compositions to which their remarkable catalytic activity was attributed. Nevertheless, the amorphous base compositions discussed by Grant Mickelson in the above-noted copending application demonstrated the ability to convert hydrocarbons at conversion levels and with selectivities which in some instances were superior to and more desirable than the results obtainable with alternative catalysts having compositions based primarily on the aluminosilicate zeolites. The dramatic improvements in affinity for hydrocarbon conversion exhibited by the catalyst discussed in the above-noted copending application are believed to be attributable at least in part to the manner in which the active metal components are deposited from the specified impregnating solutions. These conclusions are substantiated by the results presented in that application which are incorporated herein by reference.

Due to the relatively high cracking activity of zeolite catalysts their application in the preparation of hydrofining, e.g., denitrogenation and desulfurization, compositions has been substantially limited. Such catalysts have in the past and continue to be prepared from substrates having considerably lower cracking activity indices based on amorphous refractory foraminous oxides such as alumina and silica stabilized alumina. However, as discussed in the Mickelson application, the catalysts therein disclosed find application not only in denitrogenation and desulfurization of petroleum feeds but also exhibit very attractive hydrocracking conversion and selectivity, particularly in the production of turbine fuels, diesel oils and furnace oils. In fact, the conversion levels and selectivities realized with the amorphous-base catalysts discussed by Mickelson in the production of mid-barrel fuels exceed those attainable with zeolite-base catalysts in certain applications. Therefore, for several reasons, there would appear to be little incentive to apply the impregnating techniques discussed by Mickelson to the preparation of zeolite containing catalysts.

Aside from the fact that superior conversions to middle distillate fuels can be obtained in the absence of zeolites, there is a further consideration that essentially every form of crystalline aluminosilicate is destroyed, at least with regard to its crystalline properties, upon exposure to acidic environments having a pH of about 3.5 or below. Obviously exposure of acid sensitive zeolites, e.g., the natural and synthetic faujasites, to Mickelson's highly acidic impregnating soluions having pH values below about 2 would result in the rapid destruction of the characteristic physical crystalline structure of the aluminosilicate.

Nevertheless, it has now been discovered that even though certain ostensibly desirable qualities of aluminosilicates are indeed destroyed upon exposure to strongly acidic impregnating solutions, the acidic impregnation of combinations of minor amounts of these materials with amorphous foraminous refractory oxides results in the production of compositions having catalytic activity markedly superior to that exhibited by catalysts prepared under otherwise identical conditions in the absence of the aluminosilicate.

It is therefore one object of this invention to provide an improved hydrocarbon conversion catalyst. Another object of this invention is the provision of an improved method for preparing highly active hydrocarbon conversion catalysts. Yet another object of this invention is the provision of an improved hydrofining catalyst. Another object of this invention is the provision of a method for producing catalysts having improved denitrogenation and desulfurization activtiy. Yet another object of this invention is the provision of an improved hydrocracking catalyst. In accordance with another objective of this invention there is provided an improved method for producing highly active hydrocracking catalysts. Yet another object of this invention is the provision of compositions which can be easily activated by conventional procedures to produce active hydrocarbon conversion catalysts. Another object of this invention is the provision of a method for producing compositions which can be easily converted by conventional activation procedures, e.g., sulfiding and calcination to form active hydrofining hydrocracking catalysts.

DETAILED DESCRIPTION

In accordance with one embodiment of this invention a composition subject to activation by conventional procedures to form a highly active hydrocarbon conversion catalyst is prepared by intimately admixing an amorphous foraminous refractory oxide containing a substantial proportion of alumina with at least one crystalline ion exchangeable aluminosilicate containing less than about 5 wt. percent alkali metals determined as the corresponding oxides, contacting the resultant combination with an aqueous acidic solution of at least one soluble Group VIII metal compound, at least one soluble Group VI metal compound and at least one acid of phosphorus at an initial pH below about 3 under conditions sufficient to deposit a catalytically active amount of the Group VIII and Group VI metal compounds upon the refractory support and react at least a portion of the aluminosilicate with the acidic aqueous medium.

Although a wide variety of Group VI and Group VIII metal compounds can be employed in the impregnating solution, it is of course understood that these compositions should be in a form easily convertible, e.g., by thermal decomposition and/or sulfiding to catalytically active forms of the corresponding metal.

In accordance with another embodiment of this invention a hydrocarbon conversion catalyst is prepared by intimately admixing an amorphous foraminous alumina containing refractory oxide with at least one crystalline ion exchangeable aluminosilicate having an ion exchange capacity of at least about 0.3 milliequivalents per gram, a predominance of said ion exchange capacity being satisfied by at least one Group VIII metal-containing cation. The concentration of the aluminosilicate should be sufficient to promote the activity of the final composition, usually below about 50 wt. percent, preferably within the range of 0.5 to about 20 wt. percent on a dry weight basis. The resultant combination is impregnated with an acidic aqueous solution at a pH of less than about 2.5 containing at least one soluble thermally decomposable Group VIII metal compound, at least one soluble thermally decomposable Group VI metal compound and an acid of phosphorus in amounts sufficient to deposit about 1 to about 10 wt. percent of the corresponding Group VIII metal oxide, about 5 to about 40 wt. percent of the corresponding Group VI metal oxide and provide a phosphorus to Group VI metal oxide equivalent weight ratio at about 0.05 to about 0.5 and calcining and sulfiding the resultant composition. The actual phosphorus concentration will usually be within the range of 1.0 to about 5.0 wt. percent in the final composition.

The drawing is a graphical presentation of an activity comparison between the catalyst of this invention and a composition otherwise prepared.

As previously mentioned and as demonstrated in the illustrative examples, the aluminosilicate combined with the foraminous refractory alumina-containing oxide is chemically reacted and modified to a substantial degree upon contacting with the highly acidic impregnating solutions described herein. For example, the characteristic structure of crystalline aluminosilicates is essentially destroyed when such materials are contacted in combination with the foraminous oxide with the described impregnating solutions as indicated by the absence of the characteristic peaks in X-ray diffraction spectra. Nevertheless, the resultant compositions exhibit markedly superior hydrofining and hydrocracking activities as compared to catalysts prepared in the absence of minor amounts of such aluminosilicates under otherwise identical conditions.

The reason for these improvements in catalytic activity are as yet unexplained. In fact the several superior qualities of these compositions are rather unexpected particularly in view of the fact that the characteristics of certain aluminosilicates to which the superior activity of those compositions is usually attributed are apparently destroyed upon exposure to the severe conditions existing during the described impregnation. For example, the structural integrity of crystalline aluminosilicates is apparently destroyed by chemical attack by the impregnating systems. The nature of such acid attack is known to involve, at least in part, the chemical attack of aluminum atoms in the aluminosilicate and the consequent formation of catalytically inactive forms of aluminum as well as destruction of the cellular crystalline structure. Both of these properties, i.e., the presence of catalytically active aluminum sites and the cellular crystalline structure are believed to be essential prerequisites to the catalytic activity exhibited by such compositions. Of course, the amorphous aluminosilicates are also known to exhibit catalytic activity which has been attributed to the presence of active aluminum sites similar to those found in the crystalline analogues. It would therefore be expected that the loss of these characteristics which is known to result from severe acid attack would result in a relatively inactive product. Going one step further, it does not seem unreasonable to conclude that the presence of a relatively inactive component in a catalyst would markedly improve the activity or selectivity of that catalyst. However, the compositions of this invention exhibit markedly superior activity and selectivity although they are contacted under the severe acid conditions described herein. It is for these reasons that the superiority of the catalysts of this invention was not expected.

Another as yet unexplained quality of these compositions is their markedly increased tolerance to deactivating influences existing in the described hydrocarbon conversion systems. It is generally known that hydrocarbon conversion catalysts deactivate with continued use due to one or more factors which are known to inhibit catalytic activity. In fact, the ability of such catalysts to maintain a predetermined level of activity has long been recognized as a significant criterion in catalyst selection. Consequently, it was rather surprising to observe that incorporation of aluminosilicates into the described catalyst systems markedly reduced the deactivation rate of the resultant compositions, i.e., reduced the necessary temperature increase requirement (TIR) with run length, even though the identifiable qualities of certain of those aluminosilicates were destroyed upon exposure to the described severe impregnating conditions.

CATALYST PREPARATION

The foraminous alumina-containing refractory oxides employed in preparing these compositions should contain a substantial proportion of alumina, i.e., at least about 50 wt. percent alumina on a dry weight basis. These materials can consist completely of alumina or can contain additional oxides such as silica and zirconia. In fact, in some applications the inclusion of minor amounts of silica in the alumina is preferred for the purpose of stabilizing the physical structure of the resultant composite. Such compositions usually contain up to about 20 wt. percent, generally about 2 to about 10 wt. percent silica on a dry weight basis, the remainder of the foraminous oxide being composed of alumina. However, it should be observed that inclusion of silica into the alumina starting material exhibits some influence on hydrocarbon conversion characteristics, particularly selectivity. For example, the higher silica composites generally exhibit somewhat higher cracking activities and higher selectivity to gasoline as opposed to midbarrel fuels. As a result, it may be preferable to minimize the amount of silica present in the original foraminous oxide or eliminate it altogether when it is desirable to employ the resultant catalysts primarily in the production of midbarrel fuels.

These aluminas are distinguished from the aluminosilicates employed herein in several respects. The original aluminosilicates are zeolitic, possess relatively high ion exchange capacities, i.e., in excess of 0.3 meg./gram, and generally have relatively high silica concentrations, i.e., in excess of 50 wt. percent based on the combined weight of silica and alumina. In contrast, the foraminous oxides comprise in excess of 50 wt. percent alumina, are relatively non-zeolitic and possess relatively low ion exchange capacities, e.g., below about 0.1 meg. per gram.

The surface area and pore volume of the original foraminous oxide are also important considerations in the preparation of a highly active catalyst. As a general rule, the surface area of the alumina-containing refractory oxide should be at least about 50 square meters per gram. The aluminas generally preferred are the relatively high surface area gamma aluminas with or without added silica having surface areas usually within the range of about 200 to about 400 square meters per gram. The pore volume of these materials is relevant to at least two desirable characteristics; the amount of impregnating solution which can be retained by the resultant composite upon impregnation and the accessibility of the resultant catalysts to the hydrocarbon process stream. As a consequence, the pore volume of the original alumina should be at least about .50 cubic centimeter per gram and is usually within the ranget of about .70 to about .90 cubic centimeter per gram.

Although it is not essential to the preparation of an active catalyst by the procedures described herein, the formainous oxide may also contain some active hydrogenation components such as Group VI or Group VIII metals or metal compounds prior to combination with the aluminosilicate. If desired, however, these metals or metal compounds can be incorporated into the refractory oxide by impregnation such as by spraying with or immersion into an aqueous solution of a dissolved salt of the desired metal compound or by mulling with the selected metal or metal compound or vapor deposition of the desired metal. The most convenient procedures involve impregnation by either spraying or immersion with aqueous solutions of a water soluble, generally thermally decomposable, salts of the selected metal such as the Group VIII metal acid salts, e.g., sulfates, nitrates, halides, phosphates, carbonates, etc. Group VI metal compounds commonly employed in such applications include ammonium molybdate, ammonium heptamolybdate, ammonium phosphomolybdate, molybdic acid, molybdic oxide, molybdenum blue, tungstic acid, chromic acid, tungstic oxide, ammonium tungstate, ammonium paratungstate, ammonium chromate, and the like.

In the initial preparation of the alumina-aluminosilicate composite it is also often desirable to provide for at least a partial peptization of the alumina in order to form a more structurally stable combination of these two constituents. This objective is readily accomplished by admixing the foraminous oxide with a minor amount of a relatively strong mineral or organic acid such as nitric, hydrochloric, acetic, formic, etc., prior to, during or after combination with the aluminosilicate. Acid concentrattons employed for this purpose are generally very minor and usually amount to less than 3 wt. percent of the foraminous oxide weight on a dry weight basis.

The foraminous oxide and aluminosilicate may be intimately admixed by any one of several effective procedures. However, certain of these are preferred due to the simplicity of operation and the effectiveness of dispersion achieved. For example, the two components can be dry mixed by mulling in a pan muller or by ball milling or similar dry mixing procedures. However, intimate admixtures of the two constituents can often be more easily achieved by mixing them in the presence of minor amounts of water sufficient to form a plastic mass of the admixed constituents. This objective can be achieved by mixing with the alumina-aluminosilicate combination an amount of water equivalent to about 20 to about 100 percent of the weight of the combined refractory oxides on a dry weight basis. Mixing of the resulting combination can be effected by any one of several means such as by mulling in a pan muller followed by extrusion to promote further intermixing.

The aluminosilicate should comprise a minor proportion of the foraminous oxide/aluminosilicate admixture and usually amounts to about 0.5 to about 20 percent by weight of the combination on a dry weight basis. However, in most applications, and particularly in the preparation of catalyst intended for the production of midbarrel fuels as opposed to gasoline range fuels, it is presently preferred to employ aluminosilicate concentrations somewhat below 50 wt. percent. However, it is presently preferable to employ aluminosilicate concentrations within the range of about 2 to about 15 wt. percent on a dry weight basis.

A wide variety of aluminosilicates can be employed within the concept of this invention. As a general rule, these aluminosilicates should contain a substantial proportion of four-coordinated aluminum atoms such that the compositions exhibit zeolitic ion exchange capacities of at least about 0.3 milliequivalents per gram, preferably in excess of about 0.5 milliequivalents per gram. The presence of alkali and/or alkaline earth metals in these aluminosilicates prior to treatment is presently considered undesirable. Consequently, these metals, which are often present in both natural and synthetic aluminosilicates in their original state, should be removed by washing or by ion exchange. Any one of numerous procedures can be employed for this purpose. Probably the most convenient include exchange with ammonium, hydrogen or Group VIII metal cations. The latter procedure is particularly preferred in that it is desirable to provide that a predominant proportion of the ion exchange capacity of the aluminosilicate be satisfied with a Group VIII metal containing cation prior to contacting with the impregnating medium hereinafter described. Hydrogen exchange can be effected by contacting the aluminosilicate with an excess of a mildly acidic aqueous solution, e.g., having a pH of at least about 5 and containing a mineral acid such as sulfuric, hydrochloric, nitric, phosphoric acids and the like. However, it is presently preferred that the predominance of the alkali and/or alkaline earth metals be removed by ammonium exchange which is generally well known in the art. This objective is usually achieved by contacting the aluminosilicate with an aqueous solution of an ionizable ammonium salt such as ammonium nitrate, ammonium chloride, ammonium sulfate, and the like in amounts sufficient to replace a predominance of the original cations.

The presently preferred preparatory techniques involve converting the aluminosilicate to the ammonium form by ammonium exchange followed by back exchange with a Group VIII metal cation preferably a non-noble metal Group VIII metal cation and particularly cations containing nickel, iron or cobalt. As a general rule the aluminosilicates should contain at least about 0.5 and preferably 1 to about 8 weight percent of the Group VIII metal cation determined as the corresponding oxide. Nickel ion in amounts of at least about 0.5 weight percent determined as the corresponding oxide (NiO) is particularly preferred for this purpose. The ammonium, hydrogen and/or Group VIII metal back exchanged ammonium and hydrogen forms of the aluminosilicate can be dried and/or calcined either before, after or intermediate the several ion exchange steps or before or after combination with the foraminous alumina-containing refractory oxide. However, it is presently preferred that the finished combination of the aluminosilicate and refractory oxide be dried and calcined prior to impregnation.

Suitable activation procedures include drying temperatures within the range of about 180 to about 350° F. and drying times of at least about 10 minutes sufficient to substantially reduce the water content of the combination. The primary purpose of this drying step is to reduce the water content of the combination sufficiently so that excessive evaporation and entrapment of steam upon subsequent calcination does not result in decrepitation of the pelleted or extruded combination. Drying temperatures within the range of about 220 to about 250° F. and contact times of about 1 hour to about 10 hours are presently preferred. After drying the combination is then calcined, usually at temperatures in excess of about 800° F., preferably within a range of about 800 to about 1300° F. The duration of calcination usually extends for at least about 1 hour, generally about 1 to about 10 hours. Although it is not believed essential to the concept of the present invention, it is presently preferred that the calcination be effected by gradually heating the foraminous oxide-aluminosilicate combination up to the calcination temperature so as to avoid decrepitation of the composite by excessive heating rates. Heating rates within the range of about 50 to about 200° F. per hour are satisfactory for this purpose.

The presently preferred aluminosilicates are the crystalline species having $SiO_2/Al_2O_3$ ratios of at least about 2. This class includes both synthetic and naturally occurring zeolites. Illustrative of the synthetic zeolites are Zeolite X, U.S. 2,882,244; Zeolite Y, U.S. 3,130,007; Zeolite A, U.S. 2,882,243; Zeolite L, Belgian 575,117; Zeolite D, Canada 611,981; Zeolite R, U.S. 3,030,181; Zeolite S, U.S. 3,054,657; Zeolite T, U.S. 2,950,952; Zeolite Z, Canada 614,995; Zeolite E, Canada 636,931; Zeolite F, U.S. 2,995,358; Zeolite O, U.S. 3,140,252; Zeolite B, U.S. 3,008,803; Zeolite Q, U.S. 2,991,151; Zeolite M, U.S. 2,995,423; Zeolite H, U.S. 3,010,789; Zeolite J, U.S. 3,011,869; Zeolite W, U.S. 3,012,853; Zeolite KG, U.S. 3,056,654. Illustrative of the naturally occurring crystalline aluminosilicates which can be suitably treated by the methods herein described are levynite, dachiardite, erionite, faujasite, analcite, paulingite, noselite, ferrierite, haulandite, scolecite, stilbite, clinoptilolite, harmotome, phillipsite, brewsterite, flakite, datolite, chabazite, gmelinite, cancrinite, leucite, lazurite, scolacite, mesolite, ptilolite, mordenite, napheline, natrolite, and sodalite. The natural and synthetic faujasite-type crystalline aluminosilicate zeolites, e.g., Zeolites X and Y, are presently particularly preferred.

CATALYST IMPREGNATION

The aluminosilicate-foraminous oxide particles are then dried and calcined prior to impregnation. Suitable impregnating systems comprise aqueous acidic solutions containing at least one soluble Group VI metal compound in a form convertible to an active metal, metal oxide or sulfide and at least one soluble Group VIII metal compound and at least one acid of phosphorus. The impregnating solution should be sufficiently acidic, i.e., have a pH of less than about 3, so that it will chemically react with the aluminosilicate. As a general rule, the pH of the impregnating solution should be below about 2.5, preferably within the range from about 1 to about 2. As disclosed in copending application S.N. 837,340, these strongly acidic solutions have several superior characteristics and form superior catalyst compositions. The Group VI metal compound is preferably soluble in the aqueous acidic medium and easily convertible to the corresponding oxide or metal upon calcination. The concentration of the Group VI metal compound is usually within the range of about 5 to about 30 weight percent determined as the corresponding oxide. Some higher concentrations within the range of 10 to about 30 weight percent are normally employed and concentrations of about 10 to about 24 weight percent based on the corresponding oxide are presently preferred. Exemplary of the soluble Group VI metal compounds presently preferred are ammonium heptamolybdate, ammonium phosphomolybdate, molybdic acid, molybdic oxide, molybdenum blue, ammonium metatungstate, ammonium paratungstate, tungstic acid, tungstic oxide, chromic acid, ammonium chromate, and the like. Similarly the Group VIII metal compound employed in the impregnation solution should be soluble therein and should generally comprise about 1 to about 8 weight percent, preferably about 1 to about 5 weight percent of the total solution based on the corresponding oxide. Exemplary of suitable Group VIII metal compounds are the acid salts such as the nitrates, sulfates, sulfites, fluorides, chlorides, bromides, phosphates, acetates and the carbonates, chloroplatinic acid, salts of ammonia complexes, and the like. The presently preferred Group VIII metals are iron, cobalt and nickel.

In addition to the described metal compounds, the impregnating solution should also contain at least one acid of phosphorus in an amount sufficient to provide an elemental phosphorus to Group VI metal oxide equivalent weight ratio within the range of about 0.05 to about 0.5, preferably within the range of 0.1 to about 0.25. Exemplary of acids of phosphorus suitable for this purpose are orthophosphoric, metaphosphoric, pyrophosphoric, phosphorus acids and the like. As previously mentioned, the acidity of the solution should be sufficient to provide a pH of less than 3 and generally less than about 2.5, preferably within the range of 1 to about 2. Consequently, if the concentration of the acid of phosphorus in the impregnating solution is not sufficient to provide an acidity of this level the pH can be lowered by the addition of other acids, preferably a strong mineral acid such as nitric, sulfuric, hydrochloric and the like.

The impregnation should be sufficient to deposit an amount of the Group VIII metal compound equivalent to about 1 to about 10 weight percent, preferably about 1 to about 6 weight percent of the corresponding oxide; and an amount of the Group VI metal compound corresponding to about 5 to about 40 weight percent, preferably 10 to about 20 weight percent of the corresponding Group VI metal oxide.

As a general rule, the amount of impregnating solution applied to the foraminous oxide-aluminosilicate combination should be sufficient to at least substantially fill the pore volume of the composition. A slight excess is usually preferred in order to effect deposition of the greatest amount of active constituents in a single step. However, it is not necessary, within the concept of this invention, that the total amount of active constituents be added to the support in a single impregnating step. As a result, the impregnation can be effected by sequential spraying and intermittent drying of the oxide support or by sequential dipping of the support into a relatively dilute solution of the active constituents. However, the presently preferred procedure is that described in the copending application and Ser. No. 837,340. That procedure is known to produce catalysts of markedly superior activity. In any event, the substrates should be maintained in contact with the impregnating solution for a period sufficient to enable at least partial reaction of the impregnating solution with the aluminosilicate portion of the support. Contact times of at least about 5 minutes and preferably an excess of 15 minutes are generally employed for this purpose.

As described in the noted copending application, the use of amounts of an acid of phosphorus, particularly relative to the concentration of the Group VI metal compound, greater than those taught by the prior art is not only effective in stabilizing the impregnating solution but also substantially enhances the catalytic activity of the finished catalyst. The reason for the enhanced activity of those catalysts is not known with certainty but is believed to relate at least in part to the fact that during the impregnation of the catalysts an amorphous colloidal film of the impregnating materials is deposited on the surface of the support. This form of deposition is contrasted to that observed when utilizing prior art procedures in which active constituents contained in an impregnating solution were at least partially precipitated from the solution or were deposited upon the support in at least a partially crystalline form as opposed to an amorphous form. The ability of the specific solutions to deposit an even amorphous film of the active constituents across the surface of the substrate is believed to result in a more uniform distribution of the active constituents on the surface of the carrier. In fact, it was shown that impregnating solutions prepared according to the process defined in the noted copending application do not crystallize or precipitate even upon standing for months at room temperature. Moreover, no crystallized or precipitated material is observed upon drying the solutions in either an evaporating dish or by evaporating the film on glass, metal or ceramic surfaces. Instead, a transparent colloidal film is formed. Solutions having compositions outside the limits of those described in the copending application and not maintained at the required pH levels tend to lose active constituents by crystallization or precipitation before or during drying and yield crystalline or semicrystalline films upon evaporation.

The conditions necessary to effect these results, i.e., the deposition of amorphous as opposed to crystalline deposits, at relatively high active component concentrations by single-step impregnation are quite critical. It is presently believed that the most critical of these conditions are the pH of the impregnating solution that exists upon contact with the catalyst support and the phosphorus to Group VI metal oxide equivalent weight ratio in both the impregnating solution and the finished catalyst. The pH necessary to achieve these results in the preferred systems must be within the range of about 1 to about 2 for the solution initially contacted with the refractory oxide support. However, it has been observed that some increase in pH to a level slightly above 2, i.e., up to about 2.5, can be tolerated during the latter stages of impregnation when the concentration of the active components in the impregnating solution is substantially diminished due to the deposition of those components on the catalyst support. However, in order to effect the form of deposition that results in production of the most desirable catalytic properties, the pH should be maintained as close as possible to a median value, i.e., about 1.5, e.g., within a range of about 1.2 to about 1.8, during the course of the impregnation. Substantial deviations from that midpoint in either direction render the impregnation solution less stable. The greater the deviation the greater the prospect of crystalline deposit formation and crystallite aggregation on the support surface or precipitation of active constituents from the impregnating solution.

The desired phosphorus to Group VI metal oxide ratio in the finished catalyst is realized by employing suitable concentrations of the acid of phosphorus and Group VI metal compound in the impregnating solution. Suitable concentrations will of course vary considerably with the particular Group VI and Group VIII metal compounds, the particular acid of phosphorus chosen, the carrier, the pH and temperature of the impregnating solution, the method of effecting the impregnation, etc., all of which are best determined empirically. For example, the preferred acid of phosphorus concentration will not generally be exactly the same in systems employing different forms of the active Group VI and Group VIII metals.

Orthophosphoric acid is the preferred source of the phosphorus component in the catalyst of this invention. However, other phosphorus acids such as metaphosphoric, pyrophosphoric, phosphorus acid and the like are also effective.

The selected Group VI metal compounds, preferably of molybdenum or tungsten, can be any or a combination of several substances such as those previously enumerated which have sufficient solubility in the impregnating solution to enable the deposition of the desired amount of metal. Illustrative compounds are the acids, oxides and simple and complex salts such as molybdenum trioxide, molybdenum blue, molybdic acid, ammonium dimolybdate, ammonium phosphomolybdate, ammonium heptamolybdate, ammonium metatungstate, ammonium paratungstate, tungstic acid, nickel and cobalt containing complex molybdates and phosphomolybdates and the like. Molybdenum is presently preferred due to the higher activity and preferred selectivity, particularly in mid-barrel hydrocracking, exhibited by the catalysts prepared therefrom. However, molybdenum containing impregnating solutions are also the most unstable and thus reflect the greatest degree of improvement when handled in the manner described in copending application Ser. No. 837,340. The presently preferred sources of molybdenum and tungsten are molybdic acid, tungstic acid, ammonium dimolybdate, ammonium heptamolybdate, ammonium metatungstate, ammonium paratungstate, molybdenum trioxide, ammonium phosphomolybdate and ammonium phosphotungstate.

As previously mentioned, the presently preferred Group VIII metal sources are the salts of the Group VIII metals and anions of strong mineral acids. Exemplary of such anions are nitrate, sulfate, phosphate and the halides, particularly bromide, chloride, and fluoride anions. This preference is due primarily to the fact that the strong acid anions disassociate upon admixture with the impregnating solution containing the acid of phosphorus and the molybdenum source to form the corresponding acid. The strength of the resulting acids is sufficient to reduce the pH to a point below about 2.5, preferably within the range of 1 to about 2 as described by Mickelson, when the preferred concentration levels of the respective metal sources are employed. The nitrates are presently the most preferred source of the Group VIII metal, nickel nitrate being particularly preferred due to the higher activity of the resultant nickel-containing catalyst. The anions other than nitrates are generally less preferred due to significant difficulties associated with their use. For example, the halides derived from the Group VIII metal halide sources are useful in preparing these compositions but result in the evolution of the acidic halide or hydrogen halide gas on drying and/or calcination. These materials are highly corrosive and are preferably avoided. However, when the characteristics of process equipment are not adversely affected by the presence of such corrosive substances these materials can be used with effectiveness equivalent to that demonstrated by the nitrates. The sulfate on the other hand is somewhat more difficult to maintain in dissolved form in the original impregnating solution making it advisable to employ slightly elevated temperatures during the impregnating step, i.e., from 100 to about 150° F. depending on the concentrations of the Group VIII metal sulfate. However, the use of the sulfate salt does have a distinct advantage. In the preparation of sulfided catalysts, the conditions of calcination can be controlled so that the sulfate is not completely driven off and can be chemically reduced to produce a sulfided composite having a much more homogeneous distribution of sulfur than could otherwise be achieved. For example, the sulfate reduction can be conveniently carried out by exposing the calcined catalyst to a reducing atmosphere of hydrogen, carbon monoxide, and the like.

A portion of the Group VIII metal constituent can also be added to the impregnating solution in the form of a weak acid salt or as the hydroxide or carbonate when it is desirable to slightly increase the pH of the impregnating solution. For example, if the admixture of the desired active metal salts and phosphorus acid results in the formation of a solution having a pH somewhat lower than that desired in the particular application, the pH can be increased by the addition of a Group VIII metal base such as nickel or cobalt hydroxides and carbonates. Nevertheless, this procedure is not presently preferred in that it requires the commensurate correlation of pH and active metal concentrations in the impregnating solution. As a result, it is presently more preferred to raise the pH when it is initially lower than that desired by the addition of a base not having a metal cation, such as ammonia. In any event, when base addition is employed to modify the initial pH the amount of added base should not be so great as to increase the pH to a value outside of the prescribed range.

Several procedural approaches can be employed to effect impregnation of the catalyst substrate with the compositions referred to. One such method referred to as the spray technique involves spraying the support with the impregnating solution. The single dip or pore volume saturation method involves contacting a support with the impregnating solution generally by dipping the substrate into the solution for a period sufficient to fill the pores with the impregnating medium. The application of vacuum is generally preferred in the latter approach since the impregnating solution can more readily enter and saturate the pores of the refractory oxide support at reduced pressures.

The amount of impregnating solution and consequently the amount of active components retained on the support will depend largely on the pore volume and adsorption capability of the support medium. Consequently, as previously mentioned, the characteristics of the support must be taken into account in determining the conditions necessary to obtain a composite of a predetermied composition. In general the preferred foraminous alumina-containing oxides should have a pore volume of at least about 0.3 cc. per gram, preferably about 0.6 to about 1.4 cc. per gram and an adsorption capacity sufficient to retain a relatively high amount of impregnating solution in a single impregnating step. Although the pore volume of the foraminous alumina-containing refractory oxide may be modified to some extent upon combination with the described aluminosilicates prior to impregnation, it is generally believed that the pore volume of the resultant combination is usually within the ranges described above.

Pore size should also be taken into account in designing the most appropriate systems for impregnating a given support. As a general rule, a higher degree of care must be exercised in the preparation of supports having relatively larger pore sizes. Better results, i.e., a higher degree of deposit homogeneity and higher activity, are realized by observing longer aging times before drying and by employing gradual drying procedures rather than more rapid flash drying and the like. These observations are particularly applicable to the impregnation of acid leached aluminas or clays in which some of the pores are usually fairly large.

The single-dip impregnating technique involves immersion of the support particles in the impregnating solution for a period of at least about 2 minutes sufficient to displace essentially all of the air in the interior of the support particles. Soaking or contact periods of about 10 to about 120 minutes with intermittent or continuous agitation of the solution and support particles is usually adequate for this purpose.

Another impregnating method which has found wide application due to the previous necessity for maintaining relatively low active component concentrations is the cyclic or multidip procedure wherein the active support is repeatedly contacted with the impregnating solution with or without intermittent drying. This procedure is less desirable in that it involves a multistep process which is far more complicated than the single dip or spray techniques. Yet another procedure which can be effectively employed within the concept of this invention involves prolonged contacting of the catalyst support with the impregnating solution at slightly elevated temperature, e.g., 100 to about 150° F., to promote the incorporation of the active components onto the support while the support is still in contact with an excess of impregnating medium. An excess of impregnating solution can be employed in this approach, i.e., a greater amount of solution than required to fill the pore volume of the catalyst support. The extended contacting period and elevated temperatures promote adsorption of active constituents contained in the excess impregnating medium on the support. Consequently, impregnating solutions of lower concentration than would be required with a single step pore saturation technique can be used effectively in this procedure. However, this approach is subject to definite disadvantages in that the relative rates of adsorption of the several active components, i.e., the Group VIII and Group VI metal compounds and phosphorus, are not the same. Consequently, the preparation of a final product having a specific predetermined composition is somewhat more difficult. These difficulties are largely eliminated by employing the preferred impregnating solution in the single step or spray technique described herein and discussed in detail in the Mickelson application.

A commercial variation of the cyclic or multidip impregnating approach involves circulating the impregnating solution through a bed of catalyst support particles until the required amount of the active constituents are deposited thereon. Here again, a more dilute solution having a higher equivalent phosphorus to Group VI metal oxide equivalent weight ratio and a somewhat higher pH may be employed in that gradual buildup of the active constituents on the catalyst support is effected by prolonged contacting. In addition, the impregnating solution can be rejuvenated during impregnation by the addition of these selected Group VI, Group VIII and phosphorus compounds in order to maintain the desired concentration levels of the several active components. However, it should be observed that in all of these impregnating procedures the pH of the solution should be maintained at a level below about 3 and preferably below about 2.5 in order to effect the desired interaction between the foraminous aluminum-containing refractory oxide and the aluminosilicate as indicated by reaction of the aluminosilicate during impregnation. Aside from these considerations equivalent phosphorus to Group VI metal oxide equivalent ratios as low as about 0.05 can be employed in the circulating dip technique providing the total concentration of active constituents is reduced by a factor of at least about 40% so that the equivalent Group VI and Group VIII metal oxide equivalent concentrations do not exceed about 14 and 4 weight percent, respectively. This limitation is generally necessary in order to maintain homogeneous impregnating solutions which, as previously discussed, result in the production of a more active catalyst.

Nevertheless, the preparation of catalysts by the general procedures envisioned herein is not necessarily so limited that the improvements associated with the inclusion of an aluminosilicate into the described catalyst supports are dependent upon the maintenance of a homogeneous impregnating solution per se. However, additional advantage is achieved by maintaining a homogeneous solution during impregnation so that crystallization and precipitation are avoided.

In accordance with the presently preferred single step impregnation technique the desired molybdenum compound, e.g., ammonium heptamolybdate, is dissolved, or partially dissolved and partially suspended in water. The acid of phosphorus, e.g., orthophosphoric acid is then added, preferably in the concentrated form (75–85 weight percent) in an amount sufficient to provide an elemental phosphorus to Group VI metal oxide weight ratio within the range of about 0.10 to about 0.25, preferably 0.12 to about 0.20. The molybdenum and phosphorus compounds are added in such amounts that the resultant absolute concentrations of each fall within the ranges previously described. The initial pH of the resultant solution is usually within the range of about 1.0 to about 2.0. Under these conditions all of the molybdenum compound is dissolved. As previously mentioned, the pH can be increased slightly if desired by the addition of one or more of the basic materials described. If pH reduction within this range is desired, additional acid of phosphorus should be added. The Group VIII metal compound, e.g., nickelous nitrate, preferably in solution as the hexahydrate salt, is then added to the solution of the phosphorus acid and Group VI metal compound to produce a final composition preferably having an equivalent Group VIII metal oxide concentration of about 2 to about 5 weight percent.

The pH of the solution will generally vary somewhat upon the addition of the Group VIII metal salt. The degree of such variation depends primarily upon the strength of the salt anion. For example, the addition of nickelous nitrate reduces the pH of the solution somewhat. The degree of this pH reduction is greater than that experienced when sulfate salts are employed due to the fact that the nitrate is the anion of a stronger acid than sulfuric acid. As a consequence of this effect, it is generally desirable to further adjust the final pH of the solution after addition of the Group VIII metal salt to the preferred value of from 1 to about 2, preferably from about 1.3 to about 1.7. If the pH of the final solution is lower than about 1 or higher than about 2, the stability of the final solution is reduced accordingly.

The pore saturation and spray techniques require the use of impregnating solutions containing predetermined amounts of active constituents in order to provide a finished catalyst having the desired composition. It is also preferable when using either the single step or multistep procedures to age the impregnated particles for at least about 30 minutes and preferably up to about 8 hours before drying and calcining. Aging the support after impregnation in the absence of excess solution under mild conditions, i.e., ambient temperatures of about 70° F. to about 150° F., results in more even distribution of active components and improves catalyst activity.

CATALYST ACTIVATION

As previously mentioned the impregnated catalyst particles should be dried gradually, rather than quickly, in order to prevent crystallization or precipitation of active constituents from the thin amorphous film deposited during the preferred impregnation technique, or accentuation of crystallization if other impregnation techniques have been employed. Neverthless, more rapid drying can be employed without negating the advantages associated with the compositions described herein. The dried pellets or extrudates are then calcined, preferably by heating gradually to a temperature of at least about 800° F., preferably within a range of about 800 to 1300° F., usually about 800 to about 950° F. The preferred calcination technique involves gradual heating, i.e., at a rate of less than about 30° F. per minute, preferably about 10 to about 15° F. per minute. Even further advantage is realized by employing more gradually heating rates, i.e., of less than about 400° F. per hour. Nevertheless, more rapid heatups to calcination temperature can be employed although they are not presently preferred.

Marked improvement in catalyst activity can be realized when the calcination is conducted by intimately contacting the catalyst particles with at least about 2, usually at least about 4, and generally from about 5 to about 50 s.c.f.m. of an oxygen-containing gas per pound of catalyst. The oxygen-containing gas, preferably air, should contain at least about 5 weight percent oxygen. In application Ser. No. 856,143, now U.S. 3,609,099 incorporated herein by reference, it is observed that the impregnated dried pellets are preferably brought to the desired calcination temperature within about 50 minutes to about 14 hours and are retained at calcination temperature for an additional period of at least about 2 minutes, preferably for about 10 minutes to about 2 hours. The described gas contacting rate should be maintained throughout the period of heatup during which the catalyst particles are brought to the prescribed calcination temperature, and must be maintained during the portion of heatup in which the catalyst particles are at a temperature above about 300° F. in order to obtain the greatest advantage of that procedure. In batch operations the gas injection rate can be discontinued shortly after the catalyst particles have reached the final calcination temperature if desired.

In their active form, metal constituents contained in the catalyst compositions of this invention should be in the form of either the free metals, the oxides or corresponding sulfides, the sulfided form being particularly preferred. The metal constituents are of course converted to the corresponding oxide upon calcination in an oxidizing atmosphere. If the corresponding metal form is desired, reduction of the oxide subsequent to calcination by contacting with a reducing atmosphere such as carbon monoxide, hydrogen, and the like, can be easily effected by procedures generally well known in the art. Conversion of the calcined oxide form to the preferred sulfide form can be easily effected by contacting the calcined composition with a sulfiding medium such as hydrogen sulfide, carbon disulfide, elemental sulfur, thioethers and thiols containing up to 8 carbon atoms per molecule. In most instances it is preferred that the sulfur donor be contacted with the oxide or free metal form of the active metal in the presence of hydrogen. Sulfiding can be effected by simply contacting with the sulfur donor. However, it is presently preferred that the calcined catalyst be contacted with a dilute form of the sulfiding agent such as the stream of 50 percent or less hydrogen sulfide in hydrogen. Temperatures involved in these procedures can vary considerably and are usually within the range of about ambient temperature, e.g., 70° F., up to about 700° F. Sulfiding with carbon disulfide or hydrocarbon sulfur donors such as the thioethers and thiols, is often conveniently effected by dissolving the sulfur donor in a solvent and contacting the calcined composition with the resultant solution. The most suitable and readily available solvents are the relatively low boiling hydrocarbons such as benzene and kerosene and include aromatic, aliphatic, arylalkyl and alkylaryl hydrocarbons usually containing less than about 10 carbon atoms per molecule. However, certain limitations on sulfiding temperature must be observed when employing such hydrocarbon solvents in view of the fact that some hydrocracking will of course occur if the temperature exceeds the incipient cracking temperature during the sulfiding step. Contacting of the catalyst composition with a sulfiding medium should be continued for a period sufficient to convert a substantial proportion of the active metal oxide to the corresponding sulfide. The rate of sulfiding will of course depend upon the concentration of the sulfiding medium and the temperature at which sulfiding is effected. Optimum conditions can be easily determined empirically. However, contact times of at least about 10 minutes should be employed under any circumstances and are usually within the range of about 30 minutes to about 10 hours. It should also be observed that the compositions of this invention can also be sulfided in situ by contacting with the hydrocarbon feed containing organosulfur compounds, particularly thiols and thioethers which are known to be present in many hydrocarbon process streams.

HYDROCARBON CONVERSION SYSTEMS

The activated catalyst can be employed in any of the several hydrocarbon conversion systems. Exemplary of such processes are hydrocracking, cracking, hydrofining, denitrogenation, desulfurization, hydrogenation, dehydrogenation, oxidation, demetallization, isomerization and the like. Hydrocarbon feeds employed in such systems include almost every form and molecular weight of hydrocarbon compounds. However, these catalysts are most commonly employed to hydrocrack and hydrofine hydrocarbons boiling above 200° F., generally within the range of 400 to about 1300° F. Reaction temperatures are usually above about 500, e.g., 500 to 900° F., preferably within the range of about 550 to about 850° F. However, the higher temperatures, e.g., 650 to 850° F., are generally preferred in single pass single stage operations. The most desirable temperatures will, of course, be determined by the nature of the hydrocarbon phase in the reaction zone and the primary objectives desired. For example, the temperatures employed in a single stage hydrocracking operation, or in the first stage of a multi-stage system, operating on a relatively heavy gas oil containing up to 1 weight percent nitrogen and up to about 6 weight percent sulfur are usually within the range of about 650 to about 850° F. However, due to the superior affinity of the cycle oil recovered from hydrocracking zones operating with these catalysts, economically feasible conversions of such cycle oil can be obtained at somewhat lower temperatures, e.g., 500 to 800° F. Similarly, when hydrofining, as opposed to hydrocracking, is the primary objective, lower temperatures, e.g., 500-750° F., pressures, e.g., 500-1500 p.s.i.g., hydrogen rates, e.g., 500-5000 s.c.f./bbl. of reactor charge and higher space velocities, e.g., 5-10 LHSV are preferable.

Reactions are conducted at liquid hourly space velocities in excess of 0.1, usually within the range of about 0.3 to about 10, commonly about 0.5 to about 5. Reaction pressures are generally within the range of about 500 to about 5000 p.s.i.g., preferably 1000 to 3500 p.s.i.g. Hydrofining and hydrocracking conversions are always effected in the presence of substantial amounts of hydrogen. Hydrogen rates are always in excess of 50 standard cubic feet, usually about 500 to about 20,000 and preferably about 3000 to about 15,000 standard cubic feet per barrel of reactor charge. More severe conditions are of course employed in hydrocracking than when hydrofining is the primary objective. When it is desirable to promote hydrofining, in the absence of substantial hydrocracking it is usually necessary to operate at higher feed throughput rates, somewhat lower temperatures and lower hydrogen partial pressures than would be employed to effect substantial degrees of hydrocracking. Nevertheless, both hydrocracking and hydrofining can be effected simultaneously in one reactor or in several series or parallel reactors if desired. However, although these compositions are much more tolerant to nitrogen containing feeds than are other catalysts, it is generally the case that the presence of organically bound nitrogen exhibits a slight inhibiting effect on the hydrocracking activity of these compositions. As a consequence of this factor the initial stages or zones intended to effect both hydrofining and hydrocracking generally serve primarily to denitrogenate and desulfurize the process stream and operate at somewhat lower hydrocracking conversion levels than do the downstream portions of the catalyst bed.

The compositions of this invention have several particularly unique characteristics which distinguish them from the most similar previously available compositions of this type, e.g., those disclosed by Grant A. Mickelson in copending application Ser. No. 837,340. It is difficult to ascertain just what particular characteristic of the finished catalyst accounts for the dissimilarities in performance between these compositions and previously available catalysts. Nevertheless, by reference to the starting materials from which these compositions are prepared, it must be concluded that the observed differences in catalyst behavior are attributable to the presence of at least one or more of the described aluminosilicates in the starting material and the manner in which those aluminosilicates modify the resultant composition or are modified by the conditions under which the compositions are prepared, or both. In this regard it is also of interest to note that the characteristics of the aluminosilicate are modified considerably upon exposure to the highly acidic impregnating solutions and/or subsequent calcination. For example, compositions prepared from crystalline aluminosilicates, containing as much as 20 weight percent of the crystalline material prior to impregnation, did not reflect the presence of any crystallinity upon analysis by X-ray diffraction subsequent to impregnation. However, a substantial amount of the original crystallinity was observed in the refractory oxide-crystalline aluminosilicate composites prior to impregnation indicating that the impregnating medium so modified the structural characteristics of the crystalline aluminosilicates that they were no longer detectable by X-ray diffraction.

The superior characteristics of the compositions of this invention include greatly increased tolerance to nitrogen containing hydrocarbon feeds, markedly higher hydrocracking and hydrofining activity and markedly lower deactivation rates than similar compositions prepared in the absence of minor amounts of aluminosilicates. For example, in the conversion of the heavy gas-oils discussed in the illustrative examples it was observed that the compositions of this invention effected conversion levels comparable to those exhibited by analogous compositions prepared in the absence of any aluminosilicate at temperatures consistently about 25 degrees lower than those required by the alternative catalyst. These results indicate that the relative activities of the compositions of this invention are about three times greater than those of the alternative compositions. It is difficult to explain the phenomenal degree of increased activity observed in this and other comparisons or to attribute that difference to the very minor amount of aluminosilicate incorporated into the refractory oxide prior to impregnation, e.g., 5 weight percent, particularly since the aluminosilicate itself is drastically modified upon exposure to the severe environment prevailing during impregnation. Nevertheless, the effect is real and remains relatively constant over a wide range of operating temperatures although the difference in activity becomes somewhat more acute at the temperatures required to obtain higher conversion levels. The examples hereinafter detailed also illustrate the markedly superior activity retention of the compositions of this invention as compared to otherwise identical compositions prepared in the absence of minor amounts of aluminosilicates. For example, in one comparison of high temperature deactivation, the composition of this invention deactivated by only about 70 F. whereas the analogous composition prepared in the absence of aluminosilicate had deactivated by 17° F. over the same run length at conditions sufficient to provide similar conversion levels. The activity retention in both of these compositions is more than competitive with the similar properties of compositions heretofore available. Nevertheless, the markedly reduced deactivation rate of the compositions of this invention is far superior to any other available catalyst having the ability to hydrocrack and hydrofine heavy hydrocarbon feeds such as heavy gas-oils, particularly nitrogenous hydrocarbon feeds, to midbarrel fuels in an economic manner.

We have also observed that these compositions are far more tolerant to nitrogen containing hydrocarbon feeds than are analogous compositions prepared in the absence of minor amounts of aluminosilicates. Similarly these compositions are far more active for hydrofining, than are the most closely related prior art catalysts.

It was rather unexpected that the inclusion of a minor amount of aluminosilicate with the refractory oxide prior to impregnation should have such a dramatic influence on the noted qualities of the resulting compositions particularly in view of the fact that the extremely severe conditions of impregnation are known to dramatically influence the physical and chemical characteristics of aluminosilicates. Whether these effects are due to some desirable chemical or physical modification of the aluminosilicate per se or are attributable to some combination or reaction between the aluminosilicate and the remainder of the refractory oxide promoted during impregnation and/or calcination is difficult to ascertain and has not yet been determined with certainty.

Yet another superior property of these compositions is their ability to hydrocrack heavy hydrocarbon feeds to one or more desired products without substantial production of refractory hydrocarbon materials. The most common refractory byproducts are the condensed polynuclear aromatic hydrocarbons, e.g., coronenes and ovalenes. The accumulation of these polyaromatic components, and/or the intolerance of cracking and/or hydrofining conversion systems to refractory polyaromatic constituents of this nature are known to detract from the efficiency and desirability of a given hydrocarbon conversion system. The degree of production of such polyaromatic contaminants in hydrocarbon conversion systems on a once-through basis is not generally sufficiently high to exhibit a substantial influence on the operation of the system per se. However, it is generally found necessary in such systems to operate on at least a partial recycle basis to enable the ultimate conversion of a maximum proportion of the original hydrocarbon feed. In such recycle systems the gradual accumulation of polyaromatic refractory contaminants generally contributes to the gradual deactivation of the catalyst ultimately requiring shutdown of the unit, catalyst regeneration, and purging of the system of accumulated refractory polyaromatic contaminants.

The necessity for such recycle operations is generally dictated by the conversion-selectivity relationships of a particular catalyst system. In essentially every situation it is desirable to maximize the production of a certain hydrocarbon product fraction, e.g., turbine fuels, furnace oils, gasolines, etc. However, the ability of a given conversion system to maximize the production of such constituents generally changes as the total conversion level in the system changes on a once-through basis. These two parameters are not independent variables although it generally is most convenient to express selectivity as a function of total conversion. In actuality both selectivity and conversion are functions of independent process parameters such as temperature, pressure, hydrogen partial pressure, liquid hourly space velocity and, of course, the inherent characteristics of the selected catalyst. In terms of the independent parameters controlling both conversion level and selectivity, the above-noted relationship should therefore be construed as indicating that when the significant operating variables are selected to maximize conversion per pass to products boiling below a given boiling point, the selectivity of the system to a specified product, particularly midbarrel fuels, suffers accordingly. For these reasons hydrocracking systems, particularly those designed for the production of midbarrel fuels, are generally operated at conversion levels of about 40 to about 70% on a once-through basis with recycle of the unconverted portion of the feed. It can readily be seen, and it has been discussed at length by previous investigators, that continuous production of minor amounts of refractory contaminants in such extinction recycle operations results in the gradual buildup of those impurities to the point that they can no longer be tolerated. Several approaches have been employed to eliminate or mitigate the effect of such refractory contaminant buildup. One such procedure involves periodically or continuously withdrawing a slip stream from the recycle stream which obviously results in an overall product yield loss based on fresh feed charged to the system.

Needless to say the development of effective means for eliminating such refractory constituents from hydrocarbon conversion systems is a desirable objective. Nevertheless, an even more effective solution to the problem is the use of catalysts such as those herein disclosed which themselves solve the problem by either preventing the formation of refractory aromatics in the first instance or exhibit such high hydrogenation and/or hydrocracking activity toward these otherwise refractory constituents that the concentration of those materials never exceeds a tolerable threshold. For example, in one operation employing the catalyst of this invention involving conversion of a vacuum gas-oil to diesel and turbine fuels, furnace oil and gasoline fractions, the ovalene and coronene levels remained constant, or actually declined over a two week run length. The API gravity of the recycle oil actually increased during this period indicating a decreased in heavy aromatic content.

The unique properties of these compositions render their application in essentially any hydrocarbon conversion process particularly attractive. For example, the relatively high aromatics hydrogenation activity of these catalysts render them particularly useful for the hydrogenation of hydrocarbon streams containing aromatics and olefinic hydrocarbons. Of even greater contemporary importance, however, is the use of these compositions for the conversion of hydrocarbon feeds to gasolines and midbarrel fuels. The versatility of these catalyst systems suggests their application in a wide variety of single and multistage systems employing single or plural catalysts. For example, these catalysts can be employed in the single stage single reactor gasoline or midbarrel hydrocracking processes operating either once-through or on partial or complete recycle. A particularly attractive system for the production of midbarrel fuels involves the single or plural stage series-flow multireactor process operating either once-through or with recycle employing the catalyst described by Grant A. Mickelson in copending application Ser. No. 837,340 in the upstream reactors functioning primarily under hydrofining conditions with the catalysts disclosed herein employed in the downstream reactors and operated principally under hydrocracking conditions to produce gasoline and/or midbarrel fuels. Particular advantage is realized when recycle operations are employed in this dual catalyst system when the recycle is directed to the downstream reaction stages containing the present catalysts which, as previously noted, are much more tolerant to refractory aromatic compositions that otherwise tend to build up in recycle systems.

A particularly preferred procedure for producing midbarrel fuels involves a multireactor, single or plural stage system employing these compositions in the upstream stages, whether or not preceded by a hydrofining zone, followed by one or more reaction zones operating with the catalyst described by Grant A. Mickelson in the above-noted copending application. As previously mentioned, and as illustrated in detail in the following illustrative examples, these compositions are far more active for midbarrel hydrocracking than are other available midbarrel hydrocracking catalysts. These catalysts also possess substantially higher activity retention and exhibit greater tolerance to nitrogen containing hydrocarbon feeds. However, the selectivity of these compositions to midbarrel fuels is somewhat lower than that exhibited by the compositions disclosed in the Mickelson application. Hence, by employing this operating technique, lower temperatures can be employed in the upstream reactors containing the present catalysts to obtain a predetermined conversion rate whether or not ammonia and/or unconverted nitrogen compounds are present in the feed. Although these compositions and those disclosed by Mickelson in the noted copending application are both susceptible to some temporary deactivation in the presence of nitrogen containing hydrocarbons, the tolerance of the catalyst herein described is decidedly superior to compositions similarly prepared without any aluminosilicate in the original alumina support. Thus, advantage can be taken of the superior properties of both of these compositions by employing the catalysts herein disclosed in the upstream contacting zones due to their superior activity in the presence of unconverted nitrogen compounds, and employing the alumina-based catalysts described by Mickelson in the downstream contacting zones due to their superior selectivity.

Systems of this nature can be operated either on a once-through basis or with recycle to either the second stage or to the first stage containing the composition of this invention, or to some intermediate point. The exact location in the system to which the recycle stream is directed will depend at least in part upon the degree of refractory constituent buildup in the recycle stream.

As previously pointed out, the compositions herein described are highly active for the conversion of refractory polyaromatic constituents which accumulate in hydrocracking systems heretofore known. Consequently if the feed employed in the selected process is such that refractory polyaromatics tend to build up in the recycle stream, at least a portion of the recycle stream should be directed to the upstream zones containing the highly active catalyst herein described so as to eliminate or at least mitigate the degree of refractory buildup.

The following examples are submitted as illustrative of the concept of this invention and should not be construed as limiting thereof.

EXAMPLE 1

The catalyst was prepared by impregnating an aluminosilicate-alumina refractory oxide support with a highly acidic solution of ammonium heptamolybdate, nickelous nitrate hexahydrate and phosphoric acid as follows: 40 grams of nickel back-exchanged ammonium-Y zeolite, containing about 1.0 weight percent sodium determined as $Na_2O$ and about 5 weight percent nickel determined as NiO, was mulled with about 700 grams of silica stabilized gamma alumina having a surface area of about 200 square meters per gram and containing about 5 weight percent $SiO_2$ on a dry weight basis. The mulling was continued for 5 minutes. Next about 820 milliliters of distilled water containing 5 milliliters of nitric acid were gradually added to the mixture over a period of about 2 minutes. Mixing was continued for an additional 45 minutes. During this latter mixing step an additional 100 grams of silica-stabilized gamma aluminum were added to the mixture. Toward the end of the mixing period 3 additional milliliters of nitric acid were added to the mixture to adjust the pH to 5.8. The mixture was then extruded through a ⅛-inch die after which it was combined with 25 milliliters of additional distilled water, mulled for 10 minutes and then reextruded through a ¹⁄₁₆-inch die to complete the mixing step. The extrudates were then dried at 200° F. in a circulating draft oven for several hours and held overnight in the oven at 200° F. followed by calcination in a muffle furnace. Calcination was effected by gradually heating the dried extrudates at a rate of about 100° F. per hour to a final temperature of 1200° F. and holding at that temperature for 2 hours.

The impregnating solution was prepared by admixing 170 grams of 85% orthophosphoric acid, 410 grams of ammonium heptamolybdate and 750 milliliters of distilled water to produce the solution having a pH of about 1.7. To this solution were then added 240 grams of nickelous nitrate hexahydrate. Additional water was added to increase the total solution volume to 1190 milliliters. The resultant solution contained 20.4 weight percent $MoO_3$, 3.7 weight percent NiO and 3.0 weight percent P on an equivalent basis at a pH of 1.2.

Five hundred grams of the calcined extrudate were then deposited in a vacuum flask and placed under vacuum. The impregnating solution was then added to the flask and the refractory oxide support was allowed to soak under vacuum for 15 minutes. The vacuum was then released and the impregnated support was then partially dried by filtration and calcined by heating gradually to a temperature of 900° F. in a period of about 14 hours and holding at 900° F. for an additional 2 hours. Throughout the calcination period the extrudates were contacted with 1500 standard cubic feet per hour of ambient air passed into the furnace and through the pellets suspended on a porous screen in the muffle furnace. The final composition contained 3.6 weight percent of the aluminosilicate on an original weight basis, 3.2 weight percent equivalent NiO, 19.0 weight percent $MoO_3$ and 2.8 weight percent P on an equivalent weight basis. Although X-ray spectra of the aluminosilicate-alumina admixture prior to impregnation showed that the refractory oxide support contained substantial amounts of crystalline aluminosilicate, the presence of the aluminosilicate subsequent to impregnation could not be detected by X-ray spectra using copper K-alpha radiation.

EXAMPLE 2

A second catalyst was prepared by the procedure described in Example 1 with the exception that the original refractory oxide contained an amount of the nickel back-exchanged ammonium Y zeolite sufficient to provide an equivalent of aluminosilicate concentration in the final product of 11%. As was the case in Example 1, the catalyst prepared by this procedure contained about 3.2 weight percent equivalent NiO, about 19 weight percent $MoO_3$ and about 2.8 weight percent elemental phosphorus on an equivalent basis.

EXAMPLE 3

A third catalyst was prepared according to the procedures described by Mickelson in copending application Ser. No. 837,340. By this procedure 500 grams of silica-stabilized gamma alumina having a surface area of 250 square meters per gram and containing about 5 weight percent $SiO_2$ in the form of ¹⁄₁₆-inch extrudates was contacted with 1190 milliliters of an impregnating solution having a composition equivalent to 20.4 weight percent $MoO_3$, 3.06 weight percent NiO and 8.8 weight percent $H_3PO_4$ (2.8 weight percent P) prepared by dissolving sufficient amounts of ammonium heptamolybdate, phosphoric acid and nickelous nitrate hexahydrate in distilled water to provide a solution having the described composition. A vacuum was then drawn on the extrudates which were then contacted with the impregnating solution for 15 minutes under vacuum followed by filtration and calcination. Vacuum was maintained on the pellets prior to and during impregnation in the preparation of this catalyst, as in the preparation of the compositions described in Examples 1 and 2, to facilitate distribution of the impregnating solution throughout the pore volume of the support. Calcination of this composition was effected in a manner identical with that described in Examples 1 and 2. The resulting catalyst had a composition equivalent to about 17 weight percent $MoO_3$, 3 weight percent NiO and 3.0 weight percent P.

EXAMPLE 4

The catalyst of Example 1 was employed to hydrocrack a heavy gas oil having a nominal boiling range of 700 to 1000° F. and API gravity of 22.3° containing 2.91 weight percent sulfur and 820 p.p.m. total nitrogen. This operation was conducted at a pressure of 2250 p.s.i.g., a liquid hourly space velocity of 0.75 LHSV and a hydrogen rate of 8000 standard cubic feet per barrel of fresh feed. The temperature was varied during the run so as to obtain several conversion levels, i.e., conversion to products boiling below a D–86 Group 4 ASTM endpoint of 630° F. The temperature cutoff of 630° F. ASTM corresponds to midbarrel products including furnace oils, turbine fuels and diesel fuels.

Prior to introduction of the heavy gas oil, the catalyst was activated by the following procedure. First the catalyst was dried by contacting with a flowing stream of dry nitrogen at 1180 GHSV and a pressure of 75 p.s.i.g. and heating to 450° F. at a rate of 50° F. per hour and holding at 450° F. for 2 additional hours then heating to 850° F. at a rate of 100° F. per hour and holding at 850° F. for additional 3 hours. After cooling to 300° F. the catalyst was contacted with a sulfiding mixture of 1 volume percent carbon disulfide in kerosene at a liquid hourly space velocity of one v./v./hr. for 4 hours under a nitrogen pressure of 75 p.s.i.g. Hydrogen recycle gas was then introduced to the reactor at a rate of 6000 standard cubic feet per cubic foot of catalyst per hour (GHSV) and the resultant sulfiding conditions were maintained for an additional 8 hours. The temperature was then gradually increased to 400° F. over a period of 2 hours and held at 400° F. for an additional 8 hours at otherwise identical conditions. The temperature was then again increased while still contacting the catalyst with the carbon disulfide-kerosene mixture and hydrogen from 400° F. to 500° F. over a 2 hour period and held at 500° F. for an additional 8 hours. The hydrocarbon feed was then introduced to the reactor at a rate equivalent to 0.75 LHSV and the reactor temperature was gradually increased to 711° F. sufficient to provide a conversion of 43.5% to products boiling below 630° F. ASTM on a once-through basis. The recycle hydrogen rate was 8000 s.c.f./bbl. of fresh feed. After lineout at these conditions the reactor temperature was increased to 747.5° F. at otherwise identical conditions sufficient to obtain a conversion level of 63%. After lineout at this temperature the reactor temperature was again increased at otherwise identical process conditions to 796.1° F. at which a conversion of 87% to products boiling below 630° F. was obtained. This higher reaction temperature was maintained for a period or about 48 hours after which the temperature was decreased to 780° F. and allowed to line out in order to obtain an indication of a degree of catalyst deactivation realized by operation at the higher proceeding temperature, e.g., 796° F. These data are summarized in Table I and are presented graphically in the drawing in which the circled points indicate the results obtained in this example.

EXAMPLE 5

A parallel operation to Example 4 was conducted at four different temperature levels sufficient to provide conversion levels roughly corresponding to the conversions obtained during the four run periods defined in Example 4, employing the catalysts prepared as described in Example 3.

Prior to introduction of the hydrocarbon feed, the catalyst of Example 3 was activated by contacting with a 10 vol. percent mixture of $H_2S$ in hydrogen at atmospheric pressure and ambient temperature at a gas hourly space velocity of 500 cubic feet per hour per volume (of catalyst) while gradually heating the catalyst from room temperature (75° F.) to 450° F. at a rate of 60° F. per hour and holding at 450° F. for an additional 4 hour period. Under continued flow of the hydrogen-hydrogen sulfide mixture the reactor was then heated to 700° F. at a rate of 60° F. per hour and held at 700° F. for an additional 2 hours. The reactor was then cooled to 600° F. and the flow of hydrogen-$H_2S$ mixture was discontinued. Fresh hydrogen was then introduced to the reactor at a rate of 8000 standard cubic feet per barrel of fresh feed prior to introduction of the heavy gas oil described in Example 4. The hydrocarbon feed was then introduced at an equivalent liquid hourly space velocity of 0.75, a total reactor pressure of 2250 p.s.i.g. and the temperature was gradually increased to 728° F. sufficient to provide a conversion of about 38% after equilibrium had been reached. Three additional run periods at 776° F., 826° F. and 817° F. were conducted in that sequence. The data from these operations are also included in Table 1 and are illustrated graphically in the figure.

From these results summarized in Table 1 some of which are presented graphically in the figure, it is apparent that the catalyst of Example 1, i.e., the catalyst of this invention, was consistently 25° F. more active than the catalyst of Example 3. In other words, the catalyst of Example 1 was so highly active that by its use conversions could be obtained throughout a wide range at temperatures about 25° F. lower than those required to obtain similar conversions with analogous compositions not prepared in accordance with this invention. In addition, at the higher temperatures required to obtain conversion levels approaching 90%, the catalyst of Example 3 showed markedly higher deactivation rates than did the catalyst of Example 1. From these data, particularly a comparison of Runs 3 and 4 operating on the catalyst of Example 1 to Runs 7 and 8 operating with the catalyst of Example 3, it is apparent that the deactivation rate of the catalyst of Example 3 was at least about twice that exhibited by the catalyst of Example 1. Thus, the superior activity and activity retention demonstrated by the catalyst of this invention make it far more suitable than the previously available compositions for prolonged once-through hydrocracking at relatively high conversion levels even though the selectivity to midbarrel fuels exhibited by the catalyst of Example 1 was not in all respects equivalent to that obtained with the catalyst of Example 3. The total liquid yields obtained with both catalysts, i.e., the $C_4$ and higher boiling fractions, were roughly equal at about 110.5 and 110.9 volume percent of fresh feed (vol. percent f.f.) respectively. The turbine fuel fraction, i.e., the 300 to 500° F. boiling range product, produced by the catalyst of Example 1 in run period No. 2 (extrapolated to 100% conversion on the basis of these single pass data) was 53.2 as compared to 58.4 vol. percent f.f. for the catalyst of Example 3. However, liquid yields of the higher boiling constituents in the furnace oil range obtained with the catalyst of Example 1 were somewhat higher at 27% than were the yields to the same product realized by use of the catalyst of Example 3 at 25.8% based on fresh feed. This form of representation of the data was selected to clarify the relative selectivities of these two catalysts even though furnace oil range products are usually characterized as those boiling within the broader range of 300 to 700° F.

EXAMPLE 6

Another operation was conducted with the catalyst of Example 1 and the heavy gas oil described in Example 4 under recycle conditions in which the reactor product was first separated in a high pressure separator to recover hydrogen recycle gas and then fractionated to recover hydrocracked products boiling below 685° F. ASTM as product. The remainder, i.e., the reactor effluent boiling above 685° F., was recycled to the reactor and introduced to the reaction zone along with fresh feed. This operation was conducted over a two-week period at the beginning of which the catalyst was about 30 days old, i.e., had been exposed to reaction conditions for about 30 days prior to the incidence of this operation. Prior to being exposed to reaction conditions the catalyst had been activated by the procedure described in Exam-

TABLE 1

| Example No. | 4 | | | | 5 | | | |
|---|---|---|---|---|---|---|---|---|
| Run Number | 1 | 2 | 3 | 4 | 5 | 6 | 7 | 8 |
| Catalyst of Example | 1 | 1 | 1 | 1 | 3 | 3 | 3 | 3 |
| Temp., °F | 711 | 748 | 796 | 780 | 723 | 776 | 826 | 817 |
| Conversion to 630° F. E.P. ASTM | 43.5 | 63 | 87 | 38 | 65.5 | 86 | 76.5 |
| Furnace oil [2] | 39.5 | 48.5 | 48.5 | 46.5 | 37.5 | 53.5 | 54.5 | 55.0 |
| Yields,[1] vol percent f.f.: $C_4$: | | | | | | | | |
| 300–550° F | | 30.3 | | | | 26.7 | | |
| 300–550° F | | 53.2 | | | | 58.4 | | |
| 550–700° F | | 27.0 | | | | 25.8 | | |
| Total $C_4+$ | | 110.5 | | | | 110.9 | | |

[1] Extrapolated to 100% conversion by recycle on the basis of single pass data.
[2] Vol percent f.f., 350°–630° F. range product.

ple 4 by contacting at various temperatures with a mixture of carbon disulfide in kerosene. During the two-week period of this operation the reaction zone was maintained at 2250 p.s.i.g., a liquid hourly space velocity of about 0.74 and the hydrogen feed rate (including recycle) of 8000 standard cubic feet per barrel of fresh feed to the hydrocracking zone. The reactor temperature was controlled throughout the operation to provide complete, i.e., 100%, conversion of the total reactor feed to products boiling below 685° F., by operating at or near 50 percent conversion per pass.

It is generally the case in such operations, i.e., extinction recycle, that the severity of hydrocracking conditions required to maintain complete conversion of the fresh feed and recycle streams to the hydrocracking zone must be gradually increased as a function of run length due to gradual deactivation of the catalyst and accumulation of refractory polyaromatic catalyst inhibitors in the recycle oil system. This is particularly true in systems such as the one presently under investigation, in which further precaution is not taken to prevent the build up of refractory catalyst inhibitors in the recycle stream. This characteristic of hydrocracking systems, i.e., the necessity to gradually increase reaction temperature, is conventionally referred to as temperature increase requirement and is a limiting factor in all previously known hydrocracking systems. However, it was quite unexpectedly observed in this instance that the temperature required to maintain complete conversion of the fresh feed and recycle feeds to the hydrocracking zone actually decreased from an initial of 729° F. to a final temperature of 723° F. at the termination of the two-week recycle operation. In other words, the over all system exhibited a negative temperature increase requirement. This is not to say that the activity of the catalyst per se increased with run length. On the contrary, it is more reasonable to conclude on the basis of the data, some of which are summarized in Table 2, that the catalyst of this invention exhibited such selectivity either for preventing the formation of refractory deleterious constituents or was so highly active for the conversion of these materials that the susceptibility of the total hydrocracker feed, i.e., including the recycle stream, to hydrocracking in this system actually improved. This improvement can only be attributed to the desirable influences exhibited on the feed in the hydrocracking zone by the catalyst of Example 1.

TABLE 2

| Run period, days | 0-4 | 4-9 | 9-14 |
|---|---|---|---|
| Reaction temp., °F.[1] | 729 | 725.5 | 723 |
| Conversion to 685° F., vol. percent, f.f. | 100 | 100 | 100 |
| Conversion per pass, vol. percent, f.f. | 51.4 | 49 | 48.7 |
| Yields, vol. percent, f.f.: | | | |
| 300-500° F., E.P | 52 | 51.4 | 53.6 |
| 500-685° F., E.P | 35 | 36 | 32 |
| 300-685° F., E.P | 86.9 | 87.3 | 85.5 |
| Recycle oil: | | | |
| Gravity, °API [2] | 38.6 | 39.3 | 39.3 |
| Coronenes, p.p.m | 43 | 10 | 41 |
| Ovalenes, p.p.m | 2.5 | 1.4 | 9 |
| C/H wt. ratio | 6.09 | 5.87 | 5.85 |

[1] All other conditions remained constant, vis., 2,250 p.s.i.g., 0.74 LHSV and 8,000 s.c.f. H₂/bbl. fresh feed.
[2] The gravity of 685° F. plus recycle oil fraction prior to commencement of recycle oil operation had been running at 35.3° API and increased as shown during the recycle operation.

These data illustrate that the reaction temperature at otherwise identical reaction conditions required to maintain conversion of fresh feed at 100% during the recycle oil operation decreased from 729° F. at the outset of the recycle operation period to 723° F. during the final period of recycle operation. This decrease in the temperature required to maintain the described 100% conversion to products boiling below 685° F. was attributed to the gradual improvement noted in the quality of the recycle oil namely; an increase in API gravity and saturates level and a negligible rate of build up of ovalenes and coronenes. As a consequence, and in addition to these observations, the properties of the furnace oil fraction, e.g., product boiling between 300 and 685° F. and the turbine fuel and heavy diesel fractions, e.g., the 300–500° F. and 500–685° F. fractions respectively, also improved as the run progressed. The increase in saturates level is indicated in Table 2 by the corresponding decrease in carbon to hydrogen weight ratio (C/H) from 6.09 to 5.85 during the course of the run.

EXAMPLE 7

Another operation was conducted employing the catalyst of Example 1 in operation on the heavy gas oil described in Example 4 in two series hydrocracking stages with extinction recycle of the second-stage product boiling above 550° F. in the second stage. The total reactor pressure, liquid hourly space velocity and hydrogen to hydrocarbon ratio were the same in both stages at 2250 p.s.i.g., 0.75 and 8000 s.c.f./bbl. of fresh feed respectively. The catalyst was activated as described in Example 4 by contacting with a solution of carbon disulfide and kerosene.

This procedure was effected by feeding the heavy gas oil to the first-stage hydrocracker then fractionating the product from the first stage into hydrocarbons boiling above 550° F. which were passed to the second stage for extinction conversion and recovery of turbine fuel products boiling below 550° F.

The reactor temperature in the first stage was set at 738° F., sufficient to effect about 40% conversion of the heavy gas oil fresh feed to the turbine fuel products boiling below 550° F. in the first stage. The temperature in the second stage was established in relation to the hydrocracking severity required in that zone to maintain the conversion of the 550° F. plus unconverted oil recovered from the first-stage effluent at 60% conversion per pass. This degree of severity was found to require a temperature of only 604° F. In other words, the remaining conversion of the first-stage effluent to 550° F. minus turbine fuel products was effected by the compositions of this invention at the abovenoted hydrocracking conditions at a temperature of only 604° F.

Although previous investigations of the catalyst of this invention had indicated that its superior activity, activity retention and the manner in which higher boiling hydrocarbons usually found in hydrocracking recycle streams were either eliminated or not produced by this catalyst or had little effect on it, it was in no way anticipated that 60% per pass conversion on a recycle stream could be effected in this system at a temperature of only 604° F. These results are rendered even more unique by the fact that they were obtained in a midbarrel hydrocracking system operating on heavy gas oil with a catalyst exhibiting high selectivity for midbarrel fuels products.

It is generally recognized in hydrocracking systems, particularly in midbarrel hydrocracking systems, that greater activity, i.e., conversion per pass at any given set of operating conditions, is usually achieved at the expense of selectivity to midbarrel fuels. Nevertheless, the catalyst of this invention still provided a relatively high selectivity to turbine fuel boiling between 300 and 550° F. as indicated by the yields of 65.5 vol percent based on the volume of fresh feed achieved during the operation described in this example. The total conversion to products boiling between butane, i.e., C-4 hydrocarbons, and the 550° F. end point amounted to 19.9 vol percent based on fresh feed.

Several different operations were conducted at conditions designed to provide an indication of the relative hydrofining, e.g., denitrogenation and desulfurization, activity of the catalyst of this invention as compared to otherwise identical catalysts prepared without an aluminosilicate which are known to be highly active hydrofining catalysts. These comparisons were conducted at conditions which promoted some molecular weight reduction as indicated by the lower average boiling point of the products. However, the fact that some molecular weight reduction occurred does not negate the validity of the comparison for purposes of establishing the relative activities of each of these compositions for denitrogenation and desulfurization.

EXAMPLES 8 AND 9

These two operations employed the composition described by Mickelson in copending application Ser. No. 837,340 prepared in accordance with the procedures described in that application and in Example 3 and contained 18 weight percent $MoO_3$, 3 weight percent NiO, and 3 weight percent phosphorus. Both runs were conducted at 2200 p.s.i.g. and a space velocity of 0.5 LHSV in the presence of once-through hydrogen at a rate of 5000 standard cubic feet per barrel of fresh feed. The only difference between these two runs was the temperature in the reaction zone which was 724° F. in the first operation, Example 8, and 700° F. in the second run, Example 9.

The feed employed in these examples was a vacuum gas oil boiling between 550 and 1110° F. and containing 0.63 weight percent sulfur and 0.085 weight percent nitrogen. The results of these operations are summarized in Table 3.

EXAMPLES 10 THROUGH 13

These four additional operations employed the catalyst of Example 1 prepared in accordance with this invention and were conducted at conditions identical to those described in Examples 8 and 9 and with the same feed stock. Temperatures in the reaction zone ranged from 700 to 725° F. The results of these operations are also summarized in Table 3.

TABLE 3

| Example: | Reaction temperature, °F. | Product analyses | |
|---|---|---|---|
| | | Sulfur, p.p.m. | Nitrogen, p.p.m. |
| 8 | 724 | 29 | 1.5 |
| 9 | 700 | 56 | 18 |
| 10 | 725 | 27 | 0.1 |
| 11 | 725 | 25 | 0.1 |
| 12 | 725 | | 0.1 |
| 13 | 700 | 68 | 6.8 |

The superior hydrofining activity of the compositions of this invention is readily apparent from a comparison of this nitrogen levels in the several treated products. The activity of the comparison catalyst employed in Example 8 was sufficient to reduce the nitrogen level in the product to 1.5 p.p.m. at 724° F. In comparison, the catalyst of this invention employed in Examples 10 through 12 at 725° F. reduced the nitrogen level to less than 0.1 p.p.m. illustrating that the denitrogenation activity of the compositions of this invention is at least several times greater than that of the comparison catalyst.

A similar conclusion is derived from comparison of Examples 9 and 13. In Example 9, employing the comparison catalyst at 700° F., the nitrogen level in the treated product was reduced to only 18 p.p.m. By comparison the composition of this invention employed in Example 13 at 700° F. reduced the final nitrogen level to about ⅓ that realized in Example 9, i.e., 6.8 p.p.m.

The activities of these two compositions for removing sulfur from the vacuum gas oil feed appeared to be about comparable. The comparison catalyst employed in Example 9 possibly demonstrated a slight advantage at lower temperatures over the composition of this invention employed in Example 13. In these two examples, conducted at 700° F., the comparison catalyst was sufficiently active with regard to desulfurization to reduce the final sulfur content to 56 p.p.m. By comparison the composition of this invention employed in Example 13 at 700° F. reduced the final sulfur content to about 68 p.p.m.

Numerous variations and modifications of the concept of this invention will be apparent to one skilled in the art in view of the aforegoing disclosure and the appended claims.

We claim:
1. The composition of matter that forms upon contacting an intimate admixture of an amorphous foraminous refractory oxide containing at least 50 weight percent alumina and at least one zeolite selected from natural and synthetic ion exchangeable crystalline zeolitic aluminosilicates having substantially higher ion exchange capacity than said foraminous oxide, with an aqueous acidic solution of at least one soluble Gorup VIII metal compound, at least one soluble Group VI metal compound and at least one acid of phosphorus at an initial pH below about 3 under conditions sufficient to deposit a catalytical-acidic solution of at least one soluble Group VIII metal compounds upon said combination and react at least a portion of said zeolite with said acidic aqueous medium.

2. The composition of claim 1 wherein said alumina containing refractory oxide is selected from alumina, and combinations of alumina and at least one of silica and zirconia, said zeolite constitutes about 0.5 to about 20 weight percent of said admixture of said refractory oxide and said zeolite, said aqueous acidic solution comprises about 5 to about 30 weight percent of said Group VI metal compound and about 1 to about 10 weight percent of said Group VIII metal compound determined as the corresponding oxides, and has an initial pH of less than about 2.5, the equivalent weight ratio of elemental phosphorus to said Group VI metal compound determined as a corresponding oxide is within the range of about 0.05 to about 0.5, and the thus impregnated admixture is thermally activated by calcination at a temperature of at least about 800° F.

3. The composition of claim 1 wherein said foraminous refractory oxide is selected from alumina and silica-alumina combinations containing up to about 20 weight percent silica, said zeolite is selected from natural and synthetic acid degradable crystalline aluminosilicate zeolites, the concentration of said zeolite in said admixture is within the range of about 2 to about 15 weight percent on dry weight basis, said admixture is contacted with said aqueous acidic medium at an initial pH below about 2.5, the concentration of said Group VI metal compound in said aqueous acidic medium is within the range of about 15 to about 30 weight percent based on the corresponding oxide, the concentration of said Group VIII compound in said aqueous acidic medium is within the range of about 1 to about 5 weight percent based on the corresponding oxide, and the ratio of phosphorus to the equivalent weight of said corresponding Group VI metal oxide is within the range of about 0.1 to about 0.25, said admixture is contacted with said acidic medium in an amount sufficient to at least fill the pores of said admixture for a period of at least about 5 minutes, and the thus impregnated combination is activated in the presence of oxygen at a temperature of at least about 800° F.

4. The composition of claim 1 wherein said Group VI metal compound is selected from the water soluble thermally decomposable salts of molybdenum and tungsten, said Group VIII metal compound is selected from water soluble thermally decomposable salts of nickel and cobalt, and said acid of phosphorus is orthophosphoric acid.

5. The composition of claim 1 wherein said zeolite is a crystalline acid degradable zeolitic aluminosilicate having an exchange capacity of at least about 0.3 milliequivalents per gram and at least a predominance of said exchange capacity is satisfied with at least one cation selected from nickel, iron and cobalt prior to contacting with said aqueous acidic medium, said foraminous oxide is selected from relatively high surface area alumina and silica stabilized alumina containing up to about 20 weight percent silica on a dry weight basis, said admixture contains about 0.5 to about 20 weight percent of said zeolite on a dry weight basis, said initial pH is below about 2.5, said Group VI metal is selected from molybdenum and tungsten, said Group VI metal compound constitutes about 5 to about 30 weight percent of said medium, determined as the corresponding oxide, said Group VIII metal compound contains nickel or cobalt and constitutes about 1 to about 10 weight percent of said medium determined as the corresponding oxide, said acid is orthophosphoric acid and is present in an amount sufficient to provide a weight ratio of phosphorus to said corresponding Group VI metal oxide within the range of about 0.05 to about 0.5, said admixture is contacted with said aqueous acidic solution in amounts sufficient to at least fill the pores thereof for a period of at least about 5 minutes, and the thus impregnated combination is thermally activated in the presence of oxygen at a temperature within the range of about 800 to about 1300° F.

6. The composition of claim 5 wherein said Group VI metal compound is selected from ammonium heptamolybdate, molybdic acid, molybdenum trioxide, molybdenum blue, ammonium phosphomolybdate, tungstic acid, tungstic oxide, ammonium meta tungstate and ammonium paratungstate, said Group VIII metal compound is selected from the nitrates, sulfates, fluorides, chlorides, bromides, acetates and carbonates of cobalt and nickel, said foraminous oxide is selected from alumina and combinations of silica and alumina containing up to about 20 weight percent silica having a surface area of at least about 50 square meters per gram and said zeolite is selected from acid degradable zeolites having $SiO_2/Al_2O_3$ ratios above about 2.

7. The composition of claim 1 wherein said foraminous oxide is selected from alumina and combinations of silica and alumina containing up to about 20 weight percent silica on a dry weight basis having a surface area of at least about 50 square meters per gram, said zeolite is selected from natural and synthetic acid degradable crystalline aluminosilicates, said admixture comprises about 0.5 to about 20 weight percent of said zeolite on a dry weight basis, said aqueous acidic solution comprises about 5 to about 30 weight percent of said Group VI metal compound selected from molybdic acid, ammonium heptamolybdate, ammonium phosphomolybdate, molybdenum trioxide, molybdenum blue, tungstic acid, ammonium tungstate, tungstic oxide and ammonium paratungstate determined as the corresponding oxide, about 1 to about 10 weight percent of said Group VIII metal compound selected from the nitrates, sulfates, fluorides, chlorides, bromides, acetates and carbonates of iron, cobalt and nickel, and at least one acid of phosphorus selected from orthophosphoric, metaphosphoric, pyrophosphoric and phosphorous acids in an amount sufficient to provide a phosphorus to Group VI metal oxide ratio within the range of about 0.05 to about 0.5, said initial pH is less than about 2.5, and said admixture is contacted with said aqueous acidic solution in an amount sufficient to at least substantially fill the pores thereof for a period of at least about 5 minutes sufficient to destroy the structure of a predominance of said aluminosilicate as indicated by the diminution of crystallinity monitored by X-ray spectra.

8. The composition of claim 1 containing about 1 to about 10 weight percent of said Group VIII metal compound selected from nickel and cobalt as a corresponding oxide or sulfide, about 5 to about 40 weight percent of molybdenum sulfide and sufficient phosphorus to provide an equivalent phosphorus to molybdenum oxide weight ratio within the range of about 0.12 to about 0.25, and said zeolite is crystalline zeolite Y.

9. The composition prepared by thermally activating the impregnated composition of claim 7 at a temperature of at least about 8000° F. while contacting said composition with at least about 2 standard cubic feet per minute of an oxygen containing gas per pound of said composition and sulfiding the resultant calcined composition.

10. The composition prepared by contacting an intimate admixture of at least one foraminous oxide selected from alumina and silica alumina combinations having a surface area of at least about 50 square meters per gram and at least one of natural and synthetic crystalline aluminosilicate zeolites having an exchange capacity of at least about 0.3 milliequivalents per gram in an amount corresponding to about 0.5 to about 20 weight percent of said zeolite with an aqueous acidic medium at a pH of less than about 2.5 and containing about 5 to about 30 weight percent determined as a corresponding oxide of at least one water soluble thermally decomposable Group VI metal compound selected from ammonium heptamolybdate, ammonium phosphomolybdate, molybdic acid, molybdenum trioxide, molybdenum blue, tungstic acid, tungstic oxide, ammonium metatungstate and ammonium paratungstate, about 1 to about 10 weight percent of at least one water soluble thermally decomposable Group VIII metal compound based on the equivalent weight of the corresponding oxide selected from nickel and cobalt nitrates, sulfates, sulfites, fluorides, chlorides, bromides, acetates and carbonates, and an amount of at least one of acid of phosphorus selected from orthophosphoric, metaphosphoric, pyrophosphoric and phosphorous acids sufficient to provide a phosphorus to Group VI metal oxide equivalent ratio within a range of about 0.05 to about 0.5 in an amount at least sufficient to substantially fill the pore volume of said admixture and continuing said contacting for a period of at least about 15 minutes.

11. The composition of claim 10 wherein said impregnated admixture is thermally activated by heating to a temperature within a range of about 800 to about 1300° F. at a rate not substantially in excess of about 400° F. per hour while contacting said admixture with at least about 2 standard cubic feet per minute of an oxygen containing gas per pound of said admixture.

12. The hydrocarbon conversion catalyst prepared by sulfiding the calcined composition of claim 11 wherein said zeolite is selected from acid degradable zeolites having $SiO_2/Al_2O_3$ ratios of at least about 2, said Group VI metal is at least one of molybdenum and tungsten, said Group VIII metal is at least one of nickel and cobalt, and said acid of phosphorus is orthophosphoric acid.

13. The hydrocarbon conversion catalyst prepared by contacting an intimate admixture of Y-zeolite and at least one of alumina and silica alumina combinations with the solution that forms upon admixing water, at least one Group VI component selected from ammonium phosphomolybdate and ammonium heptamolybdate, orthophosphoric acid and at least one Group VIII component selected from the strong mineral acid salts of nickel and cobalt, said solution having an initial pH below about 3 and an equivalent $P/MoO_3$ ratio of at least about 0.05, and said admixture is contacted with said solution in an amount and for a period of time sufficient to diminish the crystallinity of said Y-zeolite and deposit on said admixture catalytically active amounts of said Group VI and said Group VIII components.

14. The composition of claim 13 wherein said Y-zeolite constitutes about 0.5 to about 20 weight percent of said admixture on a dry weight basis, the concentration of said Group VI component in said solution is equivalent to about 5 to about 30 weight percent $MoO_3$, the concentration of said Group VIII component in said solution is equivalent to about 1 to about 10 weight percent of the corresponding oxides, said initial pH is about 1 to about 2, said $P/MoO_3$ ratio is about 0.05 to about 0.5 and said impregnated admixture is activated in an oxygen-containing atmosphere at a temperature of at least about 800° F. for a period sufficient to substantially convert said Group VI and Group VIII components to the corresponding oxides.

15. The composition of claim 13 containing about 1 to about 10 weight percent of said Group VIII metal component as the corresponding oxide or sulfide and about 5 to about 30 weight percent of molybdenum oxide or sulfide and wherein said Y-zeolite constitutes about 0.5 to about 20 weight percent of said admixture.

16. The composition of claim 13 wherein said Y-zeolite constitutes about 0.5 to about 20 weight percent of said admixure, said Group VI component is ammonium heptamolybdate, said Group VIII metal component is selected from the nitrates, carbonates, sulfates and chlorides of nickel and cobalt, the concentration of said Group VI components in said solution is equivalent to about 5 to about 30 weight percent $MoO_3$, the concentration of said Group VIII component in said solution is equivalent to about 1 to about 10 weight percent of the corresponding oxide, the concentration of said orthophosphoric acid in said solution is equivalent to a $P/MoO_3$ ratio within a range of about 0.1 to about 0.25, said initial pH is about 1 to about 2 and said admixture is contacted with said solution in an amount and for a period of time sufficient to substantially diminish the crystallinity of the said zeolite and deposit catalytic amounts of said Group VI and Group VIII components thereon.

17. The composition of claim 14 wherein said impregnated combination is thermally activated by contacting in an oxygen-containing atmosphere at a temperature of at least about 800° F. for a period of time sufficient to substantially convert said Group VIII and said Group VI metal components to the corresponding oxides said combination and is contacted, at least during the initial portion of said activation period, with at least about two standard cubic feet per minute of said oxygen-containing atmosphere per pound of said impregnated combination.

18. The composition of claim 13 wherein said Y-zeolite is selected from nickel and cobalt back-exchanged ammonium and hydrogen Y-zeolites containing less than 2 weight percent $Na_2O$, said zeolite constitutes about 0.5 to about 20 weight percent of said combination, said solution comprises about 5 to about 30 weight percent of said Group VI component determined as a corresponding oxide, about 1 to about 10 weight percent of said Group VIII metal component determined as a corresponding oxide and sufficient orthophosphoric acid to provide a $P/MoO_3$ ratio of about 0.05 to about 0.5, and said Group VIII metal component is selected from nickel nitrate and cobalt nitrate.

References Cited
UNITED STATES PATENTS

| | | | |
|---|---|---|---|
| 3,551,510 | 12/1970 | Pollitzer et al. | 252—455 Z |
| 3,557,024 | 1/1971 | Young et al. | 252—455 Z |
| 3,442,794 | 5/1969 | Van Helden et al. | 252—455 Z |
| 3,446,727 | 5/1969 | Secor | 252—455 R |
| 3,501,418 | 3/1970 | Magee, Jr., et al. | 252—455 Z |

CARL F. DEES, Primary Examiner

U.S. Cl. X.R.

252—455 Z

UNITED STATES PATENT OFFICE
CERTIFICATE OF CORRECTION

Patent No. 3,706,693         Dated   December 19, 1972

Inventor(s) Grant A. Mickelson, Darryl L. Jones & William J. Baral

It is certified that error appears in the above-identified patent and that said Letters Patent are hereby corrected as shown below:

Column 26, line 11, "Gorup" should read --Group--;
         line 15, delete in its entirety and insert in lieu thereof --ly active amount of said Group VIII and Group VI metal--.

Column 29, line 30, after "oxides" insert --and--.

Column 30, line 1, delete "and".

Signed and sealed this 22nd day of May 1973.

(SEAL)
Attest:

EDWARD M. FLETCHER, JR.
Attesting Officer

ROBERT GOTTSCHALK
Commissioner of Patents